United States Patent
Actor et al.

[15] 3,682,952
[45] Aug. 8, 1972

[54] 5(6)-N-BUTYL-2-CARBOMETHOXY-BENZIMIDAZOLE

[72] Inventors: Philip Paul Actor, Phoenixville; Joseph Frank Pagano, Paoli, both of Pa.

[73] Assignee: Smith Kline & French Laboratories, Philadelphia, Pa.

[22] Filed: May 19, 1970

[21] Appl. No.: 48,669

Related U.S. Application Data

[60] Division of Ser. No. 562,117, July 1, 1966, Pat. No. 3,574,845, which is a continuation-in-part of Ser. Nos. 387,524, Aug. 4, 1964, abandoned, and Ser. No. 516,120, Dec. 23, 1965, abandoned.

[52] U.S. Cl. ............................... 260/309.2, 424/273
[51] Int. Cl. ............................................ C07d 49/38
[58] Field of Search .................................. 260/309.2

[56] References Cited

UNITED STATES PATENTS

| | | | |
|---|---|---|---|
| 2,933,502 | 4/1960 | Klopping | 260/309.2 |
| 2,933,504 | 4/1960 | Klopping | 260/309.2 |
| 3,010,968 | 11/1961 | Loux | 260/309.2 |
| 2,920,994 | 1/1960 | Epperly et al. | 424/300 |
| 3,480,642 | 11/1969 | Stedman | 260/309.2 |
| 3,541,213 | 11/1970 | Klopping | 260/309.2 |

OTHER PUBLICATIONS

Blomquist et al. J. Amer. Chem. Soc. Vol. 56, pages 144–146 (1934). QD1.A5
Ridi et al. Chem. Abst. Vol. 49, columns 4658–4659 (1955). QD1.A51

*Primary Examiner*—Natalie Trousof
*Attorney*—William H. Edgerton, Richard D. Foggio, Joan S. Keps, Alan D. Lourie and Joseph A. Marlino

[57] ABSTRACT

Anthelmintic compositions comprising esters of benzimidazolyl carbamic acids, and their trio analogs, both of which may be optionally substituted on the benzene ring, are disclosed. A process for their preparation involves reacting cyanamide in a suitable organic solvent with the appropriate alkyl substituted haloformate to form a cyanocarbamate, followed by the addition of an o-phenylenediamine to yield the described anthelmintic agents.

1 Claim, No Drawings

5(6)-N-BUTYL-2-CARBOMETHOXY-BENZIMIDAZOLE

This application is a division of our copending application, Ser. No. 562,117, filed July 1, 1966, now U.S. Pat. No. 3,574,845 which application is a continuation-in-part of our copending applications, Ser. No. 387,524, filed Aug. 4, 1964 now abandoned, and Ser. No. 516,120, filed Dec. 23, 1965 now abandoned.

This invention relates to anthelmintic compositions containing esters of benzimidazolyl carbamic acids, and their thio analogs, benzene ring substituted esters, and to methods for producing anthelmintic activity using said esters.

According to one aspect of the invention, there are provided an anthelmintic composition and method of producing anthelmintic activity which utilizes as the essential active ingredient certain esters of benzimidazolyl carbamic acid represented by the general formula:

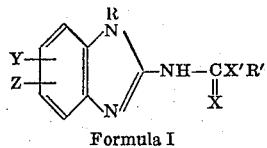

Formula I wherein R is a lower alkyl group containing from one to five carbon atoms, or preferably hydrogen;

R′ is lower alkyl containing from one to six carbon atoms; cycloalkyl including alkyl cycloalkyl containing from three to ten carbon atoms; alkenyl straight or branched chain containing from two to ten carbon atoms; alkynyl straight or branched containing from two to ten carbon atoms; phenyl; or naphthyl;

X and X′ are oxygen or sulfur, with at least one of them being oxygen; Y and Z are hydrogen, alkyl containing from one to 15 carbon atoms; lower alkoxy containing from one to 15 carbon atoms, trifluoromethyl; amino; halogen; preferably chloro or bromo; hydroxy; nitro; lower alkyl thio; alkylamino; dialkylamino; cyano; acylamino containing from two to seven carbon atoms; carboxy; carbalkoxy containing from two to seven atoms; N-alkylcarboxamido; or N, N-dialkylcarboxamido; with the alkyl substituents not specifically defined having from one to eight carbon atoms.

It is preferred to use as the active ingredient of the novel compositions of this invention, compounds as shown in Formula II below:

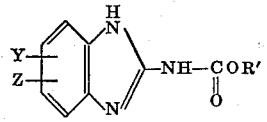

Formula II wherein R′ is lower alkyl containing from one to three carbon atoms; and Y and Z are hydrogen, lower alkyl containing from one to eight carbon atoms; lower alkoxy containing from one to eight carbon atoms; amino; alkylamino or dialkylamino, each alkyl group containing from one to four carbon atoms; halogen, preferably chloro; or nitro.

Preferred members of Formula II which are wholly novel compounds are those where R′ is cycloalkyl from three to six carbon atoms, phenyl or naphthyl.

The most advantageous compounds are those of Formula II in which one of Y and Z is lower alkyl containing from one to six carbons, or lower alkoxy containing from one to six carbons, and the other is hydrogen; and R′ is methyl.

A novel compound within Formula II of exceptional efficacy is 5(6)-n-Butyl-2-carbomethoxyaminobenzimidazole, which demonstrates excellent activity against the mouse pinworm at 10 mg./kg.; against important sheep nematodes at 5 mg./kg.; and against the migratory stages of *Ascaris suum* in mice at 0.1 percent of the diet.

An accidental synthesis of one of the thio compounds of Formula I has been mentioned in the literature but no particular pharmacological activity was attributed to it.

Specifically, the synthesis of the compound ethyl N-benzimidazolyl thionocarbamate has been reported by Wang et al., J. Am. Chem. Soc., 79, 5706 (1957). Similarly, certain compounds of Formula I wherein the R is hydrogen and the X's are both oxygen are known, but no anthelmintic activity has been suggested for them. U.S. Pat. Nos. 2,933,502 and 3,010,968)

Examples of specific compounds falling within Formula I are:

Methyl 2-benzimidazolyl carbamate
Methyl 2-benzimidazolyl thionocarbamate
Ethyl 2-benzimidazolyl carbamate
Ethyl 2-benzimidazolyl thionocarbamate
2-Benzimidazolyl-thiocarbamic acid, S-ethyl ester
Propyl 2-benzimidazolyl carbamate
Propyl 2-benzimidazolyl thionocarbamate
Isopropyl 2-benzimidazolyl thionocarbamate
Butyl 2-benzimidazolyl carbamate
Butyl 2-benzimidazolyl thionocarbamate
Isobutyl 2-benzimidazolyl carbamate
sec-Butyl 2-benzimidazolyl carbamate
Pentyl 2-benzimidazolyl carbamate
Isopentyl 2-benzimidazolyl carbamate
Hexyl 2-benzimidazolyl carbamate
4(7)-Methyl-2-carbomethoxyaminobenzimidazole
5(6)-Methoxy-2-carbomethoxyaminobenzimidazole
4(7)-Trifluoromethyl-2-carbomethoxyaminobenzimidazole
5(6)-Amino-2-carboethoxyaminobenzimidazole
4(7)-Chloro-2-carboethoxyaminobenzimidazole
5(6)-Hydroxy-2-carboethoxyaminobenzimidazole
4(7)-Nitro-2-carboethoxyaminobenzimidazole
5(6)-Methylthio-2-carboethoxyaminobenzimidazole
2-Carbovinyloxyaminobenzimidazole
2-Carboethynyloxyaminobenzimidazole
2-Carboallyloxyaminobenizmidazole
2-Carbomethallyloxyaminobenzimidazole
2Carbodimethallyloxyaminobenzimidazole
2-Carbopropargyloxyaminobenzimidazole
2-Carbophenyloxyaminobenzimidazole
2-Carbonaphthyloxyaminobenzimidazole
2-Carobcyclopropyloxyaminobenzimidazole
2-Carbo-1-methylcyclopropyloxyaminobenzimidazole
2-Carbocyclobutyloxyaminobenzimidazole
2-Carbocyclopentyloxyaminobenzimidazole
2-Carbocyclohexyloxyaminobenzimidazole
4(7)-Methyl-2-carbovinyloxyaminobenzimidazole
5(6)-Methoxy-2-carboallyloxyaminobenzimidazole
4(7)-Trifluromethyl-2-carbomethallyoxyaminobenzimidazole
4(6)-Amino-2-carbodimethylallyloxyaminobenzimidazole
4(7)-Chloro-2-carbopropargyloxyaminobenzimidazole
5(6)-Hydroxy-2-carbobutynoxyaminobenzimidazole 4(7)-Nitro-2-carbopentynoxyaminobenzimidazole
5(6)-Methylthio-2-2-carbohexynox-
yaminobenzimidazole
4(7)-Bromo-2-carboallyloxyaminobenzimidazole
5(6)-Chloro-2-carboallyloxyaminobenzimidazole
4(7)-Ethoxy-2-carboallyloxyaminobenzimidazole
5(6)-Methoxy-2-carboallyloxyaminobenzimidazole
4(7)-Nitro-2-carboallyloxyaminobenzimidazole
5(6)-Methyl-2-carboallyloxyaminobenzimidazole
4(7)-Trifluoromethyl-2-carboallylox-
yaminobenzimidazole
5(6)-Amino-2-carboallyloxyaminobenzimidazole
4(7)-Hydroxy-2-carboallyloxyaminobenzimidazole
5(6)-Chloro-2-carbomethoxyaminobenzimidazole
5(6)-Amino-2-carbomethoxyaminobenzimidazole
5(6)-Dimethylamino-2-carbomethox-
yaminobenzimidazole
5(6)-Methyl-2-carbomethoxyaminobenzimidazole
4(7)-Ethyl-2-carbomethoxyaminobenzimidazole
5(6)-n-Propyl-2-carbomethoxyaminobenzimidazole
5(6)-n-Butyl-2-carbomethoxyaminobenzimidazole
5(6)-Methoxy-2-carbomethoxyaminobenzimidazole
4(7)-Ethoxy-2-carbomethoxyaminobenzimidazole
5(6)-n-Propoxy-2-carbomethox-
yaminobenzimidazole
4(7)-n-Butoxy-2-carbomethoxyaminobenzimidazole
5(6)-n-Pentyl-2-carbomethoxyaminobenzimidazole
5,6-Dimethyl-2-carbomethoxyaminobenzimidazole
5(6)-Nitro-2-carbomethoxyaminobenzimidazole
5(6)-n-Pentyl-2-carbomethoxyaminobenzimidazole
5(6)-Isopentyl-2-carbomethoxyaminobenzimidazole
5(6)-sec-Butyl-2-carbomethoxyaminobenzimidazole
5(6)-Isobutyl-2-carbomethoxyaminobenzimidazole
5(6)-n-Hexyl-2-carbomethoxyaminobenzimidazole
5(6-n-Heptyl-2-carbomethoxyaminobenzimidazole
5(6)-n-Octyl-2-carbomethoxyaminobenzimidazole It will be readily apparent to one skilled in this art that certain of the substituted 2-aminobenzimidazole compounds (R' is branched) of this invention may have asymmetric carbon atoms, forming optically active d- and l-compounds. The connotation of the general formulas presented herein is intended to include the separated d- or l-optical isomers, as well as racemic mixtures of these isomers.

If desired, the isomers may be separated for individual use by resolution methods known to the art, such as fractional crystallization of the l-tartrate salts of the carbamates. Alternatively, a synthesis starting with an optically active side chain may yield the desired optical isomer.

The compounds of Formula I being weak bases will normally form salts with inorganic and organic acids. Accordingly, the nontoxic salts formed with pharmaceutically acceptable strong inorganic and organic acids may be alternatively employed in the compositions of the invention. Other nontoxic molecular complexes known to exist that can be derived from compounds of Formula I may also be used in this invention, since the anthelmintic acitvity rests in the benzimidazolyl carbamic acid structure itself.

The compounds of Formula I in which R is hydrogen, X is sulfur, and X' is oxygen, are prepared by reacting appropriately substituted 2-aminobenzimidazoles with carbon disulfide and an appropriate alcohol to give the corresponding ester of benzimidazolyl thiocarbamic acid by refluxing the reaction mixture on a steam bath.

In the case of the compounds of Formula I in which R is lower alkyl, X is sulfur, and X' is oxygen, these may advantageously be prepared by the same general procedure, starting with an appropriately substituted 2-aminobenzimidazole having a lower alkyl grouping on the 1-position.

The compounds of Formula I in which R is hydrogen, R' is lower alkyl, X is oxygen, and X' is sulfur, are prepared from the corresponding appropriately strongly substituted lower alkyl N-benzimidazolyl thionocarbamate by treatment thereof with an alkyl halide in a suitable solvent.

The compounds of Formula I in which R is hydrogen, and both X and X' are oxygen, are prepared by reacting cyanamide in a suitable organic solvent, such as pyridine, with the appropriate R' substituted haloformate to form a cyanocarbamate, followed by the addition of an o-phenylene-diamine to give the corresponding ester of a benzimidazolyl carbamic acid. Thus, these compounds are readily synthesized by prior art methods.

The haloformate reactant can be a chloroformate or a bromoformate, the chloroformate being preferred for reasons of availability and cost. The choice of the R' substituted haloformate is of course dependent upon the particular ester product desired.

More specifically, one to two molar equivalents of an o-phenylenediamine are added slowly to a solution of the cyanocarbamate and the reaction mixture either heated at steam bath temperature for 1–4 hours or allowed to stand at room temperature for a longer period of time, up to 24 hours. Heating for about 3 hours, following reaction at room temperature for an equal period of time is preferred.

The o-phenylenediamine reactant can have substituents on the benzene ring which correspond to Y and Z as defined in Formula I. The resulting benzimidazoles bear these substituents at the corresponding position of the benzene ring. The nature of the condensation reaction is such that it is generally applicable to o-phenylenediamines, regardless of the substituents which may appear on the benzene ring.

An alternative process for making the anthelmintic compounds of this invention starts with an S-lower alkyl pseudothiourea sulfate. This sulfate is treated with one to two equivalents of a lower alkyl haloformate in aqueous solution, and then by condensing with an optionally substituted o-phenylenediamine, yields the corresponding benzimidazole-2-carbamic acid, alkyl ester.

The compounds of Formula II wherein R' is lower alkyl and either or both of Y or Z are lower alkyl may be prepared starting with the appropriate mono- or di- lower alkyl benzene. For example, an alkylbenzene is nitrated in the presence of acetic acid to form the p-nitro alkyl benzene. This intermediate is reduced with tin chloride to give the corresponding p-aminoalkylbenzene, followed by nitration in mineral acid medium with amyl nitrate to give an o-nitro-p-alkylaniline. This latter intermediate is again reduced with tin chloride to yield a lower alkyl substituted o-phenylenediamine. The diamine intermediate is converted by the aforediscussed thiourea sulfate process to the appropriate lower alkyl substituted benzimidazole-2-carbamic acid, alkyl ester.

The compounds of Formula II in which R' is alkyl and Y is dialkylamino and Z is hydrogen, can be prepared starting with a dialkylaminobenzene, and following the above-described sequence of steps to yield the dialkylamino substituted benzimidazole-2-carbamic acid, alkyl ester.

The compounds of Formula II wherein R' is lower alkyl, Y is alkylamino and Z is hydrogen, are prepared starting with 3,4-dinitroaniline. The dinitro compound is treated with, for example, butyryl chloride to yield 1-butyramido-3,4-dinitrobenzene, which is reduced with lithium aluminum hydride to yield 1-butylamino-3,4-diaminobenzene. This triaminobenzene is converted to the corresponding benzimidazole-2-carbamic acid, alkyl ester, by the afore-discussed thiourea method.

The compounds of Formula II wherein R' is lower alkyl, Y is alkoxy, and Z is hydrogen, are prepared starting with 4-hydroxyacetanilide. The anilide is treated with the appropriate alkyl bromide and an alkali metal hydroxide, to yield the corresponding p-alkoxylacetanilide, according to the procedure of Buu-Hoi et. al., J. Chem. Soc., 1955, 1573. The substituted compound is nitrated with red fuming nitric acid, while suspended in glacial acetic acid and acetic anhydride at about 0 C. The resulting o-nitro-p-alkoxyacetanilide is collected, and is recrystallized from methanol. This disubstituted acetanilide is then deacylated by refluxing with an alkali metal hydroxide in ethanol, with the disubstituted aniline being recovered from acidified water. The disubstituted aniline is then hydrogenated at 50–80 psi in benzene, with removal of the solvent by distillation, yielding the corresponding diamine. This diamine intermediate is converted by either of the afore discussed cyanamide or thio-urea sulfate processes to the appropriate lower alkoxy substituted benzimidazole-2-carbamic acid, alkyl ester.

The compounds of Formual II wherein R' is lower alkyl, and Y and Z are alkoxy, are prepared starting with o-dihydroxybenzene. The benzene is treated with the appropriate alkyl bromide, and an alkali metal hydroxide in ethanol, to yield the corresponding o-dialkoxybenzene. The substituted compound is nitrated with nitric acid while suspended in acetic acid, to yield 1,2-dialkoxy-4,5-dinitro benzene, (J. Proc. Roy. Soc., N. S. Wales, 71, 103–11 (1938), followed by hydrogenation to give the corresponding substituted diamine. The diamine is converted, as previously described, to a 5,6-dialkoxy-benzimidazole-2-carbamic acid, alkyl ester.

The benzimidazolyl carbamates of Formula I have been found to possess useful anthelmintic properties, that is, broad spectrum activity against parasites of warm blooded animals, including both mature and immature parasitic forms. In particular, these compounds have been found to exhibit high activity against various helmintic infections of the intestinal tract of economically important animals, coupled with low systemic toxicity to the host animal.

For example, the disclosed compounds are generally effective in clearing mice of worm infections for laboratory purposes, among others: *Syphacia obvelata* and *Aspicularis tetraptera* (mouse pinworm), *Nematospiroides dubius* (mouse hookworm), and the migratory stages of Ascaris suum.

Other susceptible helminths include *Toxocara canis*, found in naturally infested dogs. Also, parasitic to this host are *Ancylostoma canium*, *Trichuris vulpis* (whipworm), and *Physalaptera* spp.

Compounds of Formula II have been demonstrated as efficacious against parasites of pigs, such as the migratory stages of *Ascaris suum*, thus preventing the development of verminous pneumonia.

Compounds of Formula I have also been demonstrated as efficacious against parasitic gastroenteritis in sheep, such as *Haemonchus contortus*, *Ostertagia* spp., *Trichostrongylus* spp., *Nematodirus* spp., *Trichuris ovis*, *Cooperia* spp., and *Strongyloides papillosus*. *Bunostomum trigonocephalum* and *Oesophagostomum* spp., are other important parasites of sheep.

Animals of low weight are treated with unit doses ranging no higher than a few milligrams; whereas animals of high body weight, such as ruminants, require proportionately larger unit doses ranging up to several grams. Preferably, a single does is administered daily for each animal species based on the weight of that species.

The amount of ingredient administered will depend on the weight of the host, but will usually be between about 1 mg./kg. and 500 mg./kg., of body weight daily.

For example, ethyl-N-benzimidazolyl thionocarbamate at an oral daily dose of 25 mg./kg. tested in clearing mice of natural pinworm infection, following generally the method of McCowen et al., reported in the American Journal of Tropical Medicine, 6, 894 (1957), gave a 45 percent result in terms of worms cleared; while a 400 mg./kg. dose gave 98 percent. Its $LD_{50}$ in mice is in excess of 1 g./kg.

Ethyl 2-benzimidazolyl carbamate at an oral daily dose of 50 and 250 mg./kg. for three days, tested in clearing mice of natural pinworm infection, gave 73 and 100 percent clearance, respectively. Additionally, this same compound, given at a daily dosage of 0.05 and 0.20 percent of diet for 5 days, against mouse hookworm infection, (0.2 percent of diet approximates 100 mg./kg. of body weight, based on 20 gram mouse) gave a 65 and 100 percent reduction in the worm burden, respectively.

2-Carboallyloxyaminobenzimidazole at an oral daily dose of 10 mg./kg. tested in clearing mice of natural pinworm infection, following generally the method of McCowen et al., gave a 69.7%*(*Figure is average of two experiments.) result in terms of worms cleared; while at a dose of 50 and 250 mg./kg. for three days, tested in clearing mice of natural pinworm infection, it gave 74.9 percent and 100 percent clearance, respectively.

In the same procedure against pinworm 5-chloro-2-carbomethoxyaminobenzimidazole, at an oral daily dose of 10 and 50 mg./kg. gave 55%*(*Figure is average of two experiments.) and 59 percent clearance, respectively.

Typical daily dosage in dogs will run from about 25 – 200 mg./kg. (preferably 100 ± 25 mg.), given orally.

In dogs, naturally infested with various gastro-intestinal helminths, ethyl 2-benzimidazolyl carbamate was particularly effective against *Trichuris vulpis*. At 100 mg./kg. of body weight the test compound caused a percent reduction ranging from zero up to 100 percent, in five dogs, with an average of 41 percent as determined by the number of helminths expelled in voided feces, as compared to the number of T. *vulpis* surviving at autopsy.

In lambs, naturally infested with various gastro-intestinal nematodes, three of the compounds of Formula I were each tested at 100 mg./kg. of body weight (B.W.), in a single dose of 10 percent concentration in city water, with the impressive results given in the tabulation below:

| Compound | Total Nematodes Mean (4 sheep) | % Reduction |
| --- | --- | --- |
| Placebo | 15,532 | — |
| Methyl 2-benzimidazolyl carbamate | 3 | 99.99 |
| Ethyl 2-benzimidazolyl carbamate | 42 | 99.7 |
| n-Butyl 2-benzimidazolyl carbamate | 56 | 99.65 |

In lambs, naturally infested with various gastro-intestinal nematodes, three of the compounds of Formula I, (formulated per Example 16) were each tested at the indicated dosages in mg./kg. of body weight (B.W.), in a single dose of 1 percent concentration in city water, with the striking results given in the tabulation below:

| Compound | Total Nematodes Mean | % Reduction |
| --- | --- | --- |
| Placebo | 11,649 (3 sheep) | — |
| 2-Carboallyloxyamino-benzimidazole (12.5 mg./kg.) | 1,088 (3 sheep) | 91.0 |
| Placebo | 8,178 (5 sheep) | — |
| 5(6)-n-Butyl-2-carbomethoxyaminobenzimidazole (12.5 mg./kg.) | 15 (5 sheep) | 99.8 |
| Placebo | 7,312 (4 sheep) | — |
| 5(6)-Methoxy-2-carbomethoxyaminobenzimidazole (15 mg./kg.) | 1,676 (4 sheep) | 77.0 |

Identification of helminths by examination of the feces of the lambs, both pre- and post-treatment, in terms of eggs per gram, and also at autopsy, verified that the tabulated compounds were highly active against almost all the sheep helminths enumerated previously. The named methyl compound was also active against *Trichuris* at 100 mg./kg. B.W. The named allyl compound was quite active against *Haemonchus, Strongyloides* and *Trichuris* at 12.5 mg./kg. B.W.

In practice, a pharmacologically active compound of structural Formula I is usually formulated with a non-toxic carrier therefore to give anthelmintic compositions of this invention. The carrier may be an orally ingestible container for the active ingredient, for example, a hard or soft gelatin capsule; or it may be a pharmaceutically acceptable diluent or excipient of the kind normally used in the production of medicaments, ready for use, for example maize starch, terra alba, lactose, sucrose, calcium phosphate, gelatin, talcum, stearic acid, magnesium stearate, dextrin, agar, pectin or acacia.

Exemplary of liquid carriers are peanut oil, olive oil, sesame oil, and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule, or compounded in the form of a troche or lozenge. The amount of solid carrier will vary widely but preferably will be from about 25 mg. to about 3 gm. If a liquid carrier is used, the preparation may be in the form of a soft gelatin capsule, placed in an ampule or in liquid suspension.

The compositions are most often made up in a form suitable for internal administration and may therefore take the form of a liquid, for example, an emulsion or a sterile solution or suspension in water, oil, such as arachis oil, or other liquid.

The compositions are advantageously made up in a dosage unit form adapted for the desired mode of administration. Thus for the preferred oral administration, the dosage unit may take the form of a suspension, tablet, packaged powder, bolus, or encapsulated powder. The quantity of active ingredient in each dosage unit will be such that one or more units are required for each therapeutic administration.

As previously mentioned, the compounds of Formula I have general anthelmintic activity and accordingly a further and most important aspect of this invention provides a method of treating helmintic infections in an animal which comprises administering, usually orally, to the animal in a sufficient nontoxic, but effective, dose an anthelmintic compound falling within the definition of Formula I, generally in the form of a pharmaceutical or veterinary composition as hereinbefore described. The daily dose range commonly used is from about 1 mg./kg. to about 500 mg./kg. depending on the species of host and regimen used. One dose per day administration is preferred but up to five of the dosage units described above may be used if desired.

Where tableting is used, the resulting tablets are then coated with methyl methacrylate to form an enteric coating, i.e. a coating which is substantially insoluble in gastric secretion but substantially soluble in intestinal fluids.

It will be appreciated that the active ingredient used in the formulation of the tablets described above may be replaced with other compounds of Formula I having the necessary anthelmintic activity. Furthermore, other materials may be used to form the enteric coating, for example other synthetic plastic materials such as methyl acrylate, cellulose derivatives, hydrogenated caster oil or phthalates.

The compositions thusly prepared are administered, usually orally, to an infected host from 1–5 times daily for anthelmintic activity.

The following examples illustrate syntheses which may be employed in formulating the compositions of the invention but are not considered limiting the invention described herebefore.

EXAMPLE 1

Preparation of Ethyl 2-benzimidazolyl thionocarbamate

A mixture of 13.3 g. of 2-aminobenzimidazole, 50 ml. of carbon disulfide, and 30 ml. of absolute ethanol is refluxed for 50 hours. The product is separated by filtration and purified by recrystallization from absolute ethanol.

EXAMPLE 2

Preparation of 2-Benzimidazolyl-thionocarbamic acid, S-ethyl ester

Three g. of ethyl 2-benzimidazolyl thionocarbamate, 4.5 ml. of ethyl iodide, and 9 ml. of dimethylformamide were mixed and stirred for 3.5 hours, at the end of which time a clear, yellow solution was present. Acetone (25 ml.) was added and evaporated at room temperature, the acetone addition and evaporation steps were repeated. Water (20 ml.) was added, which precipitated a white solid. The solid was collected (1.1 g.), washed with water, and dried in vacuo, over $P_2O_5$.

The entire product was recrystallized twice by dissolution in a minimum amount of cold glacial acetic acid, followed by water addition to initiate recrystallization. A slight opalescent appearance required charcoaling and filtration.

The crude product was again dissolved in minimal glacial acetic acid, and water added, while being maintained at 0° C. A white solid formed, which was collected, washed with water, and dried overnight, in vacuo, over $P_2O_5$, yielding a purified sample 320°–323° C., (dec.).

The structure was confirmed based on the analytical data and spectra.

EXAMPLE 3

Preparation of Ethyl 2-benzimidazolyl carbamate

Cyanamide (2.1 g.) was added to 40 ml. of pyridine, Ethyl chloroformate (4.78 ml.) was then added dropwise, while the temperature was maintained about 0°C. The reaction mixture was stirred for 10 minutes at this temperature, and then at room temperature for an additional 20 minutes.

O-Phenylenediamine (10.8 g.) was added and the mixture was allowed to stand at room temperature for three hours, then heated three hours on the steam-bath. The mixture was cooled to about 0° C., with the solid that formed being collected, washed with cold pyridine, dissolved in aqueous-ethanolic alkali, filtered, and the product precipitated by adding acetic acid. The material had m.p. 330°–331° C. (dec.). Similarly, the melting points in Examples 4 to 7 are assumed to be of the decomposition products.

EXAMPLE 4

Preparation of Methyl 2-benzimidazolyl carbamate

Using the procedure detailed in Example 3, 3.98 g. of cyanamide, 8193 g. of methylchloroformate, and 20.52 g. of o-phenylenediamine, are reacted to give 2.44 g. of crude product, m.p., 313°–315° C. Two recrystallizations from glacial acetic acid, yielded a purified product of 1.3 g. m.p. 320°–322° C., whose structure was confirmed by elemental analyses and spectral data.

EXAMPLE 5

Preparation of Propyl 2-benzimidazolyl carbamate

Using the procedure described in Example 3, the desired product may be prepared from n-propyl chloroformate, cyanamide, and o-phenylenediamine.

EXAMPLE 6

Preparation of Butyl 2-benzimidazolyl carbamate

Using the procedure of the foregoing examples, 6 g. of cyanamide, 19.04 g. of n-butyl chloroformate, and 30.24 g. of o-phenylenediamine, are reacted to give crude product (7.93 g.) m.p. 266°–268° C. Two recrystallizations from ethanol gave 3.68 g. of solids which were dried in vacuo over $P_2O_5$, yielded a dried product, whose structure was confirmed by elemental analyses and spectral data.

EXAMPLE 7

Preparation of Isobutyl 2-benzimidazolyl carbamate

Using the procedure of the foregoing examples, 6 g. of cyanamide, 19.04 g. of isobutyl chloroformate, and 30.24 g. of o-phenylenediamine are reacted to give a crude product (2 g.) m.p. about 170° C.

Two recrystallizations from methanol, give 0.341 g. of a solid, which was dried, in vacuo, over $P_2O_5$, yielding dried product, whose structure was confirmed by elemental analyses and spectral data.

EXAMPLE 8

Typical Cattle Bolus Containing an Anthelmintic Described Herein

| | |
|---|---|
| Ethyl 2-benzimidazolyl thionocarbamate | 2.0 grams |
| Calcium phosphate | 2.5 grams |
| Maize starch | 0.54 grams |
| Talcum | 0.14 grams |
| Gum arabic | 0.15 grams |
| Magnesium stearate | 0.05 grams |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a 010 mesh screen and dried at 110°–130° F. for about 8 hours. The dried materials then passed through a No. 16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acacia are of a particle size to pass a No. 10 mesh screen.

EXAMPLE 9

Typical Sheep Drench Containing an Anthelmintic Described Herein

| | Parts by Weight |
|---|---|
| Ethyl 2-benzimidazolyl carbamate | 60 |
| Terra Alba English | 35.5 |
| Tragacanth, U.S.P. | 3.0 |
| Sodium Lauryl Sulfate | 1.5 |
| Water | |

The above solid components are thoroughly mixed, giving a water dispersable powder. This powder can be directly admixed with water in concentrations on the order of 5 g. of powder to 5 cc. of water.

EXAMPLE 10

Preparation of Substituted 2-Carbalkoxyaminobenzimidazoles

When the following substituted o-phenylenediamines are substituted for the o-phenylenediamine in the procedure of Example 4, the corresponding listed products are obtained:

| Starting Material | Product |
| --- | --- |
| 3-bromo-o-phenylenediamine | 4(7)-bromo-2-carbomethoxyaminobenzimidazole |
| 3-ethoxy-o-phenylenediamine | 4(7)-ethoxy-2-carbomethoxyaminobenzimidazole |
| 3-nitro-o-phenylenediamine | 4(7)-nitro-2-carbomethoxyaminobenzimidazole |
| 3-trifluoromethyl-o-phenylenediamine | 4(7)-trifluoromethyl-2-carbomethoxyaminobenximidazole |
| 4-amino-o-phenylenediamine | 5(6)-amino-2-carbomethoxyaminobenzimidazole |
| 3-hydroxy-o-phenylenediamine | 4(7)-hydroxy-2-carbomethoxyaminobenzimdazole |

EXAMPLE 11

Novel Sheep Drench Containing an Anthelmintic Carbamate

| | Parts by Weight |
| --- | --- |
| Methyl 2-benzimidazolyl carbamate | 60 |
| Terra Alba English | 16 |
| Methyl cellulose | 1 |
| Polethylene glycol (Methocel 4000) | 20 |
| Antifoam AF | 3 |

ᵃSilicone emulsion supplied by Dow Chemical Co.

The above ingredients are suspended, one part powdered mixture to four parts water, and spray dried as is well known in the art.

EXAMPLE 12

Novel Sheep Drench Containing an Anthelmintic Carbamate

| | |
| --- | --- |
| Ethyl 2-benzimidazolyl carbamate | 10 grams |
| 0.1 N HCl solution, quantum sufficit to make 1 liter. | |

EXAMPLE 13

Preparation of 2-Carboallyloxyaminobenzimidazole

Cyanamide (4.0 g.) is added to 80 ml. of pyridine Allyl chloroformate*(*Available from Chemetron Corp., Chicago, Illinois) 11.47 g.) is then added dropwise, while the temperature is maintained about 0° C. The reaction mixture is stirred for 10 minutes at this temperature, and then at room temperature for an additional 20 minutes.

O-Phenylenediamine (20.56 g.) is added with stirring and the mixture is allowed to stand at room temperature for one hour, then is heated two hours on the steam bath, followed by the addition of 240 ml. of H₂O. The mixture is cooled to about 0° C., with the solid that formed being collected by suction filtration, and air dried. The material had a m.p. (fast heat) above 300° C. It is recrystallized once from 225 ml. ethanol, then twice from cold absolute ethanol, which will not raise the melting point of the sample. The purity and structure of the product are confirmed by thin layer chromatography, elemental analyses and spectral data.

EXAMPLE 14

Preparation of Substituted 2-Carballyloxyaminobenzimidazoles

When the following substituted o-phenylenediamines are substituted for the o-phenylenediamine in the procedure of Example 13 the corresponding listed products are obtained:

| Starting Material | Product |
| --- | --- |
| 3-bromo-o-phenylenediamine | 4(7)-bromo-2-carboallyloxyaminobenzimidazole |
| 4-chloro-o-phenylenediamine | 5(6)-chloro-2-carboallyloxyaminobenzimidazole |
| 3-ethoxy-o-phenylenediamine | 4(7)-ethoxy-2-carboallyloxyaminobenimidazole |
| 4-methoxy-o-phenylenediamine | 5(6)-methoxy-2-carboallyloxyaminobenzimidazole |
| 3-nitro-o-phenylenediamine | 4(7)-nitro-2-carboallyloxyaminobenzimidazole |
| 4-nitro-o-phenylenediamine | 5(6)-methyl-2-carboallyloxyaminobenzimidazole |
| 3-trifluoromethyl-o-phenylene | 4(7)-trifluoromethyl-2-carboallyloxyamionbenzimidazole |
| 4-amino-o-phenylenediamine | 5(6)-amino-2-carboallyloxyaminobenzimidazole |
| 3-hydroxy-o-phenylenediamine | 4(7)-hydroxy-2-carboallyloxyamionbenzimidazole |

EXAMPLE 15

When the following haloformates are substituted for the allyl chloroformate in the procedure of Example 13, the corresponding listed products are obtained:

| Starting Material | Product |
| --- | --- |
| 2-Methallylchloroformate (C.A. 46:8417 g.) | 2-Carbomethallyloxyaminobenzimidazole |
| Vinylchloroformate (U.S. Pat. 2,377,085) | 2-Carbovinyloxyaminobenzimidazole |
| Cyclopropylchloroformate | 2-Carbocyclopropyloxyaminobenzimidazole |
| Cyclobutylchloroformate | 2-Carbocyclobutyloxyaminobenzimidazole |
| Cyclopentylchloroformate (C.A. 50:4046a, 8477d.) | 2-Carbocyclopentyloxyaminobenzimidazole |
| 1-Naphthylchloroformate* | 2-Carbonaphthyloxyaminobenzimidazole |
| Phenylchloroformate* | 2-Carbophenyloxyaminobenzimidazole |

(*Available from Chemetron Corp., Chicago, Illinois

EXAMPLE 16

Preparation of 2-carbomethoxyamino-5-chlorobenzimidazole

Cyanamide (18.6 g.-0.444 moles), dried in vacuo over P₂O₅, is dissolved in 225 ml. dry pyridine and is chilled in an ice bath. The solution is stirred continuously as 34.2 ml. (42 g. = 0.444 moles) of methylchloroformate is added fairly slowly, keeping the temperature below 26° C. The solution is stirred in an ice bath for 10 minutes after the addition is completed, and then at room temperature for 1 hour. 4-Chloro-o-phenylenediamine (63.6 g. –0.444 moles) is added. The dark red solution is stirred at room temperature for 1/2 hour, and is heated on the steam bath for 5 hours.

The pyridine is evaporated with stirring at 50° C., and the resultant slurry of black oil and solid is mixed with 300 ml. ethanol, warmed slightly, and stirred until all of the black oily liquid dissolves. Only crystalline material is left undissolved. Water (100 ml.) is added and the pyridine is filtered off, washed with ethanol and dried overnight on a porous plate. Crude yield is 13.3 g. (.059 moles). 0.059

The product is suspended in 400 ml. of 1:1 of 2B ethanol:water, then 100 ml. of 2.5 NaOH is added. The solution turns black, and almost all of the solid will dissolve. The insoluble material is filtered off and the pH of the solution is adjusted to 7.5 using glacial acetic acid. A light grey solid appears. It is collected, washed with 50 percent aqueous ethanol, and dried on porous plate. (Yield = 10.2 g.)

The product is further purified by dissolving in dimethylsulfoxide at 100° C., filtering the dark solution and adding an equal volume of hot methanol. The final precipitate is light tan colored and decomposes with melting at 295°–300° C. In order to get rid of residual dimethylsulfoxide, the solid product is stirred with boiling water twice, and then filtered off. It is dried at 25° C. in vacuo over $P_2O_5$.

The structure is confirmed by elemental analyses and spectral data.

EXAMPLE 17

Typical Cattle Bolus Containing an Anthelmintic Described Herein

| | |
|---|---|
| 2-Carboallyloxyaminobenzimidazole | 2.0 grams |
| Calcium phosphate | 2.5 grams |
| Maize starch | 0.54 grams |
| Talcum | 0.14 grams |
| Gum arabic | 0.15 grams |
| Magnesium stearate | 0.05 grams |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a No. 10 mesh screen and dried at 110°–130° F. for about 8 hours. The dried materials then pass through a No. 16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acacia are of a particle size to pass a No. 10 mesh screen.

EXAMPLE 18

Typical Sheep Drench Containing an Anthelmintic Described Herein

| | Parts by Weight |
|---|---|
| 2-Carboallyloxyaminobenzimidazole | 60 |
| Terra Alba English | 35.5 |
| Tragacanth, U.S.P. | 3.0 |
| Sodium Lauryl Sulfate | 1.5 |
| Water | |

The above solid components are thoroughly mixed, giving a water dispersable powder. This powder can be directly admixed with water in concentrations on the order of 5 g. of powder to 5 cc. of water.

EXAMPLE 19

Novel Sheep Drench Containing an Anthelmintic Carbamate

| | Parts by Weight |
|---|---|
| 5(6)-n-Butyl-2-carbomethoxyamino-benzimidazole | 80.0 |
| Atmos 300[a] | 5.0 |
| Starch, U.S.P. | 12.0 |
| Tragacanth, U.S.P. | 3.0 |
| Water | q.s. |

[a] Mono and diglycerides of fat-forming fatty acids supplied by Atlas Chemical

The above solid components are thoroughly mixed, giving a water dispersable powder. This powder can be directly admixed with water in concentrations on the order of 5 g. of powder to 5 cc. of water.

EXAMPLE 20

Novel Sheep Drench Containing an Anthelmintic Carbamate

| | |
|---|---|
| 2-Carboallyloxyaminobenzimidazole | 10 grams |
| 0.1N HCl solution, quantum sufficit to make | 1 liter. |

EXAMPLE 21

Preparation of 5-Methyl-2-carbomethoxyaminobenzimidazole

Dry cyanamide (20.6 g.-0.488 moles) is dissolved in 250 ml. of dry pyridine and is chilled in an ice bath. Methyl chloroformate (46.1 g.) is added over a 20-minute period, stirred for 10 minutes in an ice bath, then at room temperature for 1.5 hours. 3,4-Toluene diamine (59.8 g.-0.488 mole) is added in one portion forming a deep wine red solution. The solution is stirred at room temperature for 40 minutes, and heated on a steam bath for 2 ½ hours, then is left at room temperature overnight.

Almost all of the pyridine is evaporated *in vacuo* and the orange residue is suspended in 700 ml. of 50 percent aqueous ethanol, to which is added 250 ml. of 2.5 N sodium hydroxide. Any undissolved solid is filtered off. The very dark filtrate is adjusted to a pH of about 7.5 using glacial acetic acid, and the precipitated crude product is collected, washed, and dried overnight on porous plates in a steam oven.

Twelve g. of crude product are dissolved in 170 ml. of dimethylsulfoxide (DMSO) at 100°–105° C., forming a dark solution, which is filtered, diluted with 190 ml. of 2B ethanol. A precipitate forms, which is chilled quickly, and is put in a freezer.

Another 15.9 g. of crude product is dissolved in 200 ml. of DMSO of 100°–105° C., which is filtered, and diluted with 180 ml. of hot ethanol. The solution is cooled quickly stored in a freezer.

The products are collected, combined and washed with 2B ethanol, yielding 13.0 g. of a slightly off-white product, which is resuspended in 500 ml. of boiling hot water and with stirring, filter, resuspended in fresh water. The procedure is repeated yielding a product which is then dried *in vacuo* over $P_2O_5$, having a m.p. 297°–303° C. (d).

EXAMPLE 22

Preparation of 5n-Butyl-2-carbomethoxyaminobenzimidazole

Using a 1000 ml. 3-necked, round bottom flask, equipped with a mechanical stirrer, addition funnel, and thermometer, 13.9 g. (0.05 moles) of 2-methyl-2-thiopseudo-urea sulfate in about 10 ml. of water is stirred in an ice bath. Methylchloroformate (9.45 g.-0.1 moles) is added at one time. The mixture is stirred at 0° C., for ten minutes, then a total of 19 ml. of 25 percent sodium hydroxide is added over ten minutes while maintaining the temperature below 20° C.

At this point the pH is about 8 and remains there after 5 minutes of stirring. Ten ml. of acetic acid is added, making the pH about 5 and keeping the temperature about 20° C.

A solution of 4-n-butyl-o-phenylenediamine ethanol, prepared from 11.9 g. (0.05 mole) of the hydrochloride, is added to the reaction mixture.

The addition funnel is replaced by a condenser, attached to three traps for methyl mercaptan, one empty and two with 10 percent aqueous NaOH. Heat is applied very slowly to the stirred mixture, with gas evolving constantly. As the temperature rises slowly, ethanol is added, to control foaming. The total reflux time is about three-fourths of an hour. The reaction is cooled to room temperature and left over the week-end.

A light tan solid is collected, washed with water, then suspended in 50 percent aqueous ethanol, and recollected. The solid is dried on a porous plate in an oven.

The product is recrystallized from 1,200 to 1,400 ml. of 30-ethanol plus 150 ml. of water, and is left in a refrigerator overnight. The product is collected and washed twice with 20 percent aqueous ethanol.

The product is then recrystallized again from 20 percent aqueous ethanol. It is dried in vacuo over $P_2O_5$, to give pure product, m.p. 225°–7° C.(d).

The structure is confirmed by elemental analysis and spectral data.

EXAMPLE 23

Preparation of 5,6-Dimethyl-2-carbomethoxyaminobenzimidazole

Using a 1-liter 3-necked, round-bottomed flask, equipped with mechanical stirrer, addition funnel, and thermometer, 20.4 g. (0.0735 moles) of 2-methyl-2-thiopseudo-urea sulfate in 10 ml. of water, is stirred and maintained at 0° C. Methylchloroformate (13.9 g.-.147 moles) is added all at once, followed by the addition of about 40 ml. of 25 percent aqueous sodium hydroxide, which is added drop-wise keeping the temperature about 15° C. and the pH about 6.

At 15° C., 18 ml. glacial acetic acid is added drop-wise over about 5 minutes reducing the pH to between 5 and 6.

Ten g. (.0735 mole) of comminuted 4,5-dimethyl-o-phenylene-diamine is added all at once to the reaction mixture, followed by 20 ml. of water.

A condenser replaces the funnel, and the gas outlet on the condenser is attached to a series of three traps. Two traps containing about 10 percent sodium hydroxide. Heat is applied very slowly, and as the temperature rises gas evolves. Ethanol is added to maintain stirrability. After one-half hour at 95° C., the reaction mixture is further diluted with water and cooled. The pasty mixture is filtered, washed with water, followed by washing with an ethanol:water mixture, and then stirred into an ethanol:water mixture. It is recollected, and dried overnight on a porous plate.

The product (13.3 g.) is recrystallized from 350 ml. DMSO plus 320 ml. of ethanol, and left in a refrigerator over-night. Crystals are collected, washed with cold ethanol, and air-dried. The solid product is boiled twice with 250 ml. of water, collected, air-dried, and dried at 25° C. in vacuo over $P_2O_5$, to give pure product, having a m.p. of 295°–305° C.(d).

The structure is confirmed by elemental analysis and spectral data.

EXAMPLE 24

Preparation of 5-Methoxy-2-carbomethoxyamidobenzimidazole

In a 500 ml. 3-necked round-bottomed flask, equipped with a thermometer, mechanical stirrer, and dropping funnel, 19.8 g. (.01 moles) of 2-methyl-2-thiopseudourea sulfate is stirred into 9 ml. of water. It is cooled to about 5° C., and methylchloroformate is added in one portion. The mixture is stirred at 10°–15° C., then 21.4 ml. of 25 percent aqueous sodium hydroxide is added drop-wise over about 10 minutes to a pH of about 7. Glacial acetic acid (8.72 g.) is added drop-wise at about 15° C. over five minutes. Ten g. (0.0725 moles) of 4-methoxy-o-phenylenediamine, in comminuted form, is added to the cream colored reaction mixture.

The addition funnel is replaced by a condenser which has its gas outlet attached to one empty trap plus two traps filled with 10 percent sodium hydroxide. Heat is applied very slowly with stirring to the reddish-brown mixture, until it is heated to about 102° C.

After one-half hour at 95°–102° C., the resulting salmon-colored mixture is cooled, stoppered, and left at room temperature overnight.

When water is added to the reaction mixture, a pinkish-white solid forms which is collected, washed with water, and then 60 percent ethanol in water mixture, to yield a white solid product. The product is again slurried in 200 ml. of ethanol-water (60:40), collected, and is dried on a porous plate.

The product is recrystallized from 1,300 ml. 30-ethanol plus 200 ml. of water. Following filtering, recrystallization occurs spontaneously, and it is left in the refrigerator overnight.

The crystals are collected, washed in 1:1 mixture of ethanol-water, giving a product, which is dried at 25° C. in vacuo over $P_2O_5$.

The product is again recrystallized, from 1,500 ml. of ethanol plus 100 ml. of water, collected, and washed with 60–40 mixture of ethanol-water and dried at 25° C. in vacuo over $P_2O_5$, yielding the pure product, having an m.p. of 235° C.(d).

EXAMPLE 25

Preparation of 5-Nitro-2-carbomethoxyaminobenzimidazole

To 12.4 g. (0.163 mole) of thiourea in 6.2 ml. of water, is added, dropwise, 14 g. (0.11 mole) of dimethyl sulfate with stirring. The mixture becomes warm and colorless, and is refluxed gently for 30 minutes, during which time a white crystalline solid appears. The reaction mixture is then cooled at 2° C., yielding 2-methyl-2-thiopseudourea sulfate.

Methylchloroformate (30.8 g.-0.326 moles) is added in one portion to the sulfate. To this mixture is added about 75 ml. of 25 percent aqueous sodium hydroxide, at a rate which maintains the temperature no higher than 15° C., with the resulting pH of about 7. To this mixture is slowly added 17 ml. of glacial acetic acid.

4-Nitro-o-phenylenediamine (25.0 g.-0.163 mole) is added in one portion, followed by 60 ml. of 30 percent aqueous ethanol.

Three mercaptan traps are connected to the condenser on the reaction flask, one empty, and two with 10 percent aqueous sodium hydroxide. The reaction mixture is heated slowly, being brought to reflux at 91° C., for one hour, after which time the mixture is cooled and filtered. The precipitate is washed with water and 30 percent cold aqueous ethanol. It is collected and is dried in a petri dish overnight, under a hood, yielding 29 g. of crude product. The product is recrystallized from dimethylformamide and water mixture, and is left to dry under a hood overnight.

The compound is then boiled in about 300 ml. of water to remove residual DMF. The boiling is repeated twice using fresh water. It is then dried on a porous plate on a steam ovar, yielding the pure product, m.p., 326°–329° C.(d).

The structure is confirmed by elemental analysis and spectral data.

EXAMPLE 26

Preparation of 5-Amino-2-carbomethoxyaminobenzimidazole

To 30 ml. of formic acid is cautiously added 0.5 g. of palladium catalyst (5% by weight on charcoal). Five grams of 5-Nitro-2-carbomethoxyaminobenzimidazole (Example 25) are dissolved in 250 ml. of formic acid, which is then added cautiously to the catalyst suspension. The reaction mixture is put on a Parr shaker for one hour, during which time 5 pounds of hydrogen are taken up. Subsequently, the mixture is filtered through Celite, and the formic acid is evaporated *in vacuo*, yielding a crude product.

Water, 100 ml., is added to the purplish-tan product, followed by 50 ml. of 3-4N hydrochloric acid. The mixture is heated on a steam bath until all of the solid dissolves, and then the solvents are evaporated with heating in vacuo, yielding the hydrochloride salt of the benzimidazole product, m.p. 243°–245° C(d).

The structure is confirmed by elemental analysis and spectral data.

EXAMPLE 27

Preparation of 5-N,N-Dimethylamino-2-carbomethoxybenzimidazole

2-Methyl-2-thiopseudourea sulfate (8.15 g.) is prepared as previously described in Example 25.

To the sulfate suspension is added 9.34 g. (0.0986 moles) of methylchloroformate in one portion. To this mixture is added dropwise (17.55 cc.) of 25 percent aqueous sodium hydroxide, while maintaining the temperature below 20° C. When the NaOH addition is completed, the pH of the mixture is about 7. The mixture is maintained below 20° C., and 7.15 cc. of glacial acetic acid are added at a fairly rapid rate.

4-(N,N-Dimethylamino)-o-phenylenediamine dihydrochloride (13.0 g.) is added in one portion, and the resulting deep-purple mixture is then gradually heated to 100° C. During the heating process, methyl mercaptan evolves which is routed through a series of three traps, as previously described. The mixture is stirred at 100°–110° C. for 0.5 hours, then cooled and diluted with 100 cc. of water. A resulting deep purple solution is then treated with 10 percent sodium hydroxide, in conjunction with a pH meter, until the pH is 8.0. A lavender solid forms, which is filtered off, washed liberally with water, and is dried on a porous plate overnight in the air, yielding 9.0 g. of crude solid.

This solid is suspended in 350 cc. of 1:1 ethanol-water, and treated with 10% aqueous sodium hydroxide until a solution, dark brown in color, forms. This is then treated with decolorizing Norit A, filtered through a Super-Cel mat, and the dark filtrate is neutralized with glacial acetic acid, to give a lavender solid. This is collected, washed with 1:1 ethanol-water, and dried on a porous plate in a steam oven, giving a solid, m.p. 270°–276° C.(d).

This compound is suspended in 1:1 ethanol-water, and sufficient 10 percent sodium hydroxide added to cause solution thereof. The dark solution is decolorized with Norit A, filtered through a Super-Cel mat, and the filtrate is neutralized to pH 6.5 with glacial acetic acid giving a pinkish-solid, m.p. 250°–275° C.(d).

This product is suspended in 400 cc. of about 20 percent aqueous ethanol. Sufficient glacial acetic acid is added to give the solution a deep violet color. The solution is decolorized with Norit A and Darco together. The mixture is filtered through a Super-Cel mat, and the filtrate is neutralized to pH 6.5 with glacial acetic acid giving a pinkish solid, m.p. 250°–275° C.(d).

This product is suspended in 400 cc. of about 20 percent aqueous ethanol. Sufficient glacial acetic acid is added to give the solution a deep violet color. The solution is decolorized with Norit A and Darco together. The mixture is filtered through a Super-Cel mat, and the filtrate is once again decolorized, again filtered through a Super-Cel mat, and then through a Whatman No. 1 gravity fluted paper (to remove any traces of finely divided charcoal).

The final filtrate is neutralized with 10 percent aqueous sodium hydroxide giving a white solid, which is filtered off, washed with water, and dried overnight.

The compound is suspended in 50 percent aqueous ethanol, then sufficient 10 percent aqueous sodium hydroxide is added to give a solution which is again filtered through a Super-Cel mat. The resulting clear light yellow filtrate is neutralized to give a white solid, which is filtered off, washed with 50 percent aqueous ethanol, and dried in a dessicator over $P_2O_5$ in vacuo, giving the pure product, 236°–237.5° C.

The structure is confirmed by elemental analysis and spectral data.

We claim:
1. 5(6)-n-Butyl-2-carbomethoxyaminobenzimidazole.

* * * * *

PO-1050
(5/69)

UNITED STATES PATENT OFFICE
CERTIFICATE OF CORRECTION

Patent No. 3,682,952          Dated August 8, 1972

Inventor(s) Philip Paul Actor and Joseph Frank Pagano

It is certified that error appears in the above-identified patent and that said Letters Patent are hereby corrected as shown below:

Change title to "5(6)-N-BUTYL-2-CARBOMETHOXYAMINOBENZIMIDAZOLE".

Signed and sealed this 20th day of February 1973.

(SEAL)
Attest:

EDWARD M. FLETCHER, JR.
Attesting Officer

ROBERT GOTTSCHALK
Commissioner of Patents